(12) United States Patent
Park

(10) Patent No.: US 12,614,781 B2
(45) Date of Patent: Apr. 28, 2026

---

(54) BATTERY MODULE

(71) Applicant: HYUNDAI MOBIS Co., Ltd., Seoul (KR)

(72) Inventor: Yun Su Park, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 928 days.

(21) Appl. No.: 17/853,246

(22) Filed: Jun. 29, 2022

(65) Prior Publication Data

US 2023/0012192 A1     Jan. 12, 2023

(30) Foreign Application Priority Data

Jul. 8, 2021    (KR) ......................... 10-2021-0089838
Feb. 16, 2022    (KR) ......................... 10-2022-0020375

(51) Int. Cl.
*H01M 10/655*        (2014.01)
*H01M 10/48*         (2006.01)
            (Continued)

(52) U.S. Cl.
CPC ..... *H01M 10/6554* (2015.04); *H01M 10/486* (2013.01); *H01M 10/613* (2015.04);
            (Continued)

(58) Field of Classification Search
CPC .......... H01M 10/6554; H01M 10/486; H01M 10/613; H01M 50/213; H01M 50/298;
            (Continued)

(56) References Cited

U.S. PATENT DOCUMENTS 8,920,955 B1     12/2014  Chuang et al.
2015/0069277 A1     3/2015  Brantweiner et al.
            (Continued)

FOREIGN PATENT DOCUMENTS

CN          209786031 U  * 12/2019  ............. Y02E 60/10
JP          2000-223160 A    8/2000
            (Continued)

OTHER PUBLICATIONS

Office Action issued in corresponding Korean patent application 10-2022-0020375 dated Feb. 8, 2023. English Translation only.
Office Action issued on Oct. 17, 2025 in Korean Patent Application No. 10-2021-0089838.

*Primary Examiner* — Kaity V Chandler
(74) *Attorney, Agent, or Firm* — Morgan, Lewis & Bockius LLP

(57)            ABSTRACT

The present disclosure provides a battery module including a center cartridge assembly, on which a plurality of battery cells are arrayed and seated, including a cooling plate inner installed therein and configured to cool a part of each of the battery cells, a side cooling cover assembly which is coupled to two sides of the center cartridge assembly to protect the battery cells seated on the center cartridge assembly and includes a cooling plate outer attached thereto and configured to cool a part of each of the battery cells, and a busbar housing assembly which is coupled to an upper portion of the center cartridge assembly and includes one or more output busbars installed thereon and configured to be electrically connected to an electrode exposed at an upper portion of each of the battery cells.

16 Claims, 8 Drawing Sheets

(51) Int. Cl.

| | | |
|---|---|---|
| *H01M 10/613* | (2014.01) |
| *H01M 10/6554* | (2014.01) |
| *H01M 50/213* | (2021.01) |
| *H01M 50/298* | (2021.01) |
| *H01M 50/507* | (2021.01) |

(52) U.S. Cl.

CPC ....... *H01M 50/213* (2021.01); *H01M 50/298* (2021.01); *H01M 50/507* (2021.01)

(58) Field of Classification Search

CPC ............. H01M 50/507; H01M 10/425; H01M 10/482; H01M 10/625; H01M 10/643; H01M 10/6555; H01M 50/249; H01M 50/262; H01M 50/264; H01M 50/284; H01M 50/503; H01M 50/528; H01M 50/569; H01M 2220/20; H01M 50/505; Y02E 60/10

See application file for complete search history.

(56) References Cited

U.S. PATENT DOCUMENTS

| 2017/0324225 A1 * | 11/2017 | Nakayama | ............... H02B 1/20 |
| 2018/0069277 A1 * | 3/2018 | Mastrandrea | ....... H01M 10/613 |
| 2020/0358127 A1 * | 11/2020 | Terauchi | ............. H01M 10/613 |

FOREIGN PATENT DOCUMENTS

| JP | 2003162993 A | * | 6/2003 | ......... H01M 10/625 |
| JP | 2009146605 A | * | 7/2009 | ............ Y02E 60/10 |
| JP | 4814405 B2 | * | 11/2011 | ......... H01M 50/528 |
| JP | 2016091653 A | * | 5/2016 | ............ Y02E 60/10 |
| KR | 10-1166023 B1 | | 7/2012 | |
| KR | 2017-0027547 A | | 3/2017 | |
| KR | 10-2056362 B1 | | 12/2019 | |
| KR | 10-2020-0025719 A | | 3/2020 | |
| KR | 10-2020-0036640 A | | 4/2020 | |
| KR | 10-2020-0078450 A | | 7/2020 | |

* cited by examiner 422
421
420
420
440
450
430
430
430
461
411
410
413
412

414     415     431
410
430
415
415
415
414
414

BATTERY MODULE

CROSS-REFERENCE TO RELATED APPLICATION

This application claims the benefit under 35 USC § 119(a) of Korean Patent Application No. 10-2021-0089838, filed on Jul. 8, 2021 and Korean Patent Application No. 10-2022-0020375, filed on Feb. 16, 2022 in the Korean Intellectual Property Office, the entire disclosure of which is incorporated herein by reference for all purposes.

BACKGROUND

1. Technical Field

The present disclosure relates to a battery module including a plurality of battery cells and parts assembled with the same.

2. Discussion of Related Art

Various manufacturers are manufacturing battery modules having various structures. A battery module is manufactured so that a plurality of basic unit battery cells (for example, cylindrical cells) are arranged to meet specifications of a predetermined voltage and a predetermined current and a battery cooling structure, a fixing member, a heat exchange member, and the like are assembled therewith.

Conventional battery modules are designed with various structures by different manufacturers, for example, with a protrusion for installing a temperature sensor formed on a battery cell frame, with a through hole corresponding to a head of the temperature sensor formed and filled with glue, with a radiation hole formed to extend in an extension direction of a column included, with a plurality of support holes formed in a frame on which a heat sink is installed, or the like.

Such structures have disadvantages that a volume and a weight of a battery module increase because unnecessary elements are added, and accordingly, costs increase, productivity decreases, and the like.

SUMMARY

The present disclosure is directed to providing a battery module with a new structure that is not present conventionally and is improved so that the insulation and cooling performance and a degree of design freedom are improved, and a volume, a weight, the number of kinds of components, and costs are decreased.

According to an aspect of the present disclosure, there is provided a battery module including a center cartridge assembly, on which a plurality of battery cells are arrayed and seated, having a cooling plate inner installed therein and configured to cool a part of each of the battery cells, a side cooling cover assembly which is coupled to two sides of the center cartridge assembly to protect the battery cells seated on the center cartridge assembly and including a cooling plate outer attached thereto and configured to cool a part of each of the battery cells, and a busbar housing assembly which is coupled to an upper portion of the center cartridge assembly and includes one or more output busbars installed thereon and configured to be electrically connected to an electrode exposed at an upper portion of each of the battery cells.

According to another aspect of the present disclosure, there is provided a battery module including a center cartridge assembly, on which a plurality of battery cells are arrayed and seated, including a cooling plate inner installed therein and configured to serve to cool a part of each of the battery cells, in which the center cartridge assembly further includes a center cartridge in a hexahedral shape, which has an exposed upper portion to which the battery cells are inserted, a lower surface having openings through which a portion of electrodes of the inserted battery cells is exposed, a left portion and a right portion which are exposed to allow side surfaces of the inserted battery cells to be exposed, and a front surface and a rear surface which are closed wall structures, and one or more connection busbars which are connected to the electrodes of the inserted battery cells to connect the electrodes of the battery cells to each other, and the cooling plate inner of the center cartridge assembly is configured to divide a space of the center cartridge assembly into which the batteries are inserted into two spaces and to cool parts of the battery cell which face the cooling plate inner.

A configuration and operation of the present disclosure will be clear through specific embodiments which will be described with reference to the accompanying drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Detailed descriptions of the present disclosure will be made with reference to the accompanying drawings illustrating examples of specific embodiments of the disclosure. These embodiments will be described in detail so that the disclosure can be performed by those skilled in the art. It should be understood that various embodiments of the disclosure are different but are not necessarily mutually exclusive. For example, specific shapes, structures, and characteristics of the embodiments described herein may be implemented in other embodiments without departing from the scope and spirit of the present disclosure. In addition, it should be understood that a position or arrangement of each component in each disclosed embodiment may be changed without departing from the scope and spirit of the disclosure. Accordingly, there is no intent to limit the present disclosure to detailed descriptions to be described below. The scope of the disclosure is defined by the appended claims and encompasses all equivalents that fall within the scope of the appended claims. Like numbers refer to the same or like functions throughout the descriptions of the drawings.

Figure 1:
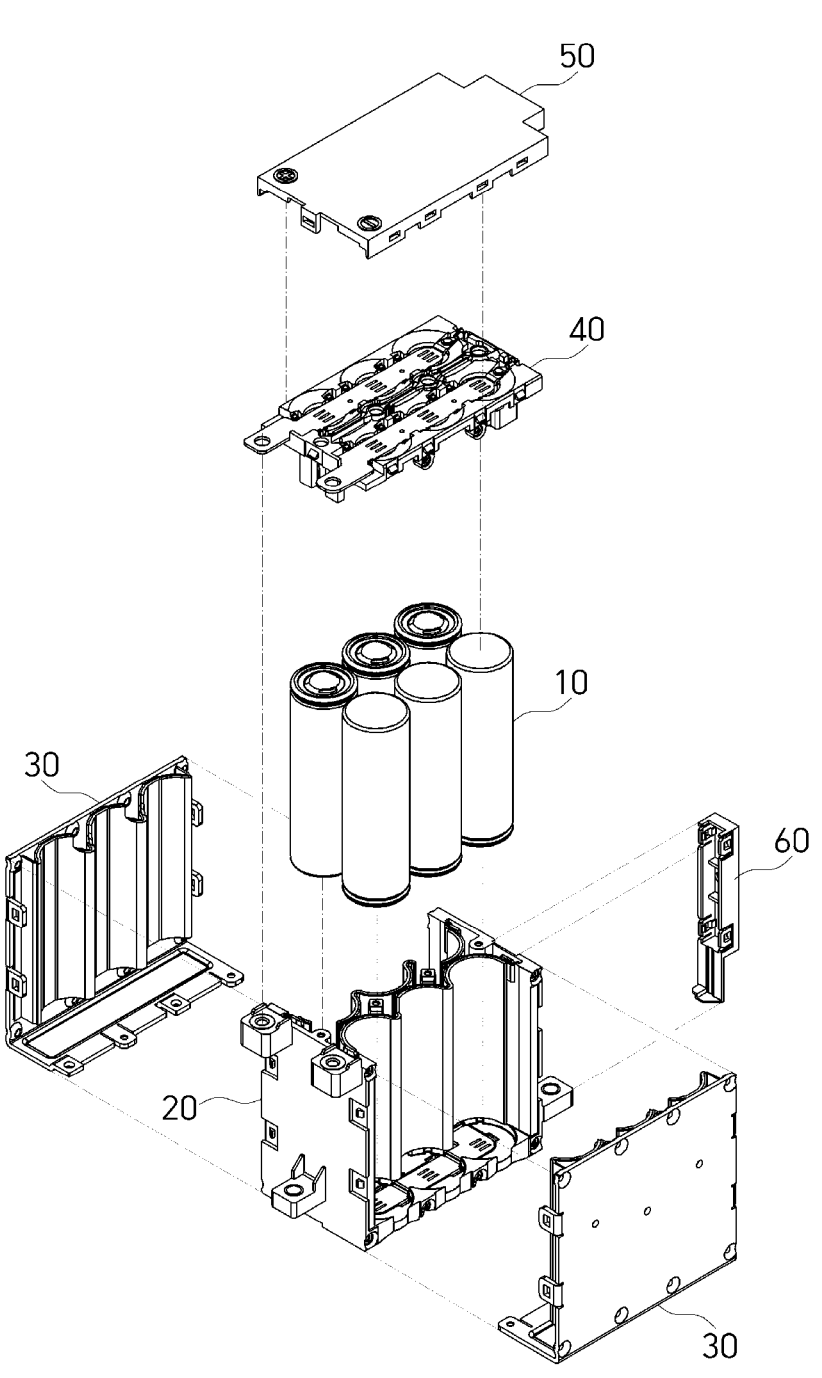
FIG. 1 is an exploded perspective view illustrating a unit battery module.
Figure 2:
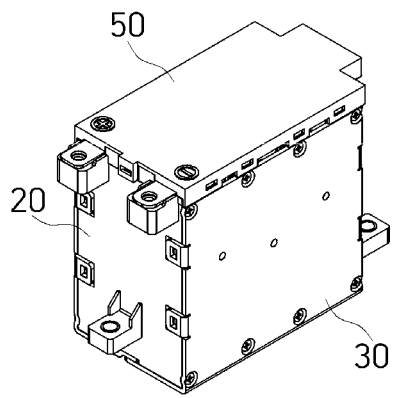
FIG. 2 is a perspective view illustrating a state in which components of the unit battery module of FIG. 1 are assembled.

FIG. 1 is an exploded perspective view illustrating a unit battery module, and FIG. 2 is an assembly perspective view.

The unit battery module includes a center cartridge assembly 20 into which cooling plate inners (refer to 220 in FIG. 4) are inserted and seated in a vertical direction so that a plurality of battery cells 10 are disposed (in this case, an array of 2×3) and which serves to cool inward-facing surfaces of the battery cells 10, side cooling cover assemblies 30 which are coupled to two sides of the center cartridge assembly 20 to cover outward-facing surfaces of the battery cells 10 seated on the center cartridge assembly 20 to protect the battery cells 10 and to which cooling plate outers (refer to 320 in FIG. 7) configured to cool the outward-facing surfaces of the battery cells 10 are attached, a busbar housing assembly 40 which is coupled to an upper portion of the center cartridge assembly 20 and by which output busbars to be electrically connected to electrodes exposed from upper portions of the battery cells 10 are supported, an upper cover 50 which covers the busbar housing assembly 40, protects the battery cells 10 and the busbar housing assembly 40, and serves as an upper finishing end of an entire battery module, and a protector 60 which is attached to a side surface of the center cartridge assembly 20 to protect wirings (electric wires) passing from the upper portion to a lower portion of the center cartridge assembly 20.

FIG. 2 is a perspective view illustrating a state in which components of the unit battery module of FIG. 1 are assembled. It can only be seen from FIG. 2 the center cartridge assembly 20 that one of the side cooling cover assemblies 30 disposed at one side, and the upper cover 50.

In an example of the unit battery module in the embodiment illustrated in FIGS. 1 and 2, the battery cells 10 including a plurality of (in this case, six) cylindrical cells are arrayed in an array of 2×3 and inserted into the center cartridge assembly 20. However, the battery cells 10 are not limited to cylindrical shapes. In addition, the battery cells 10 may be arrayed so that positions of polarities of electrodes are different from each other according to a desired serial-parallel structure.

Figure 3:
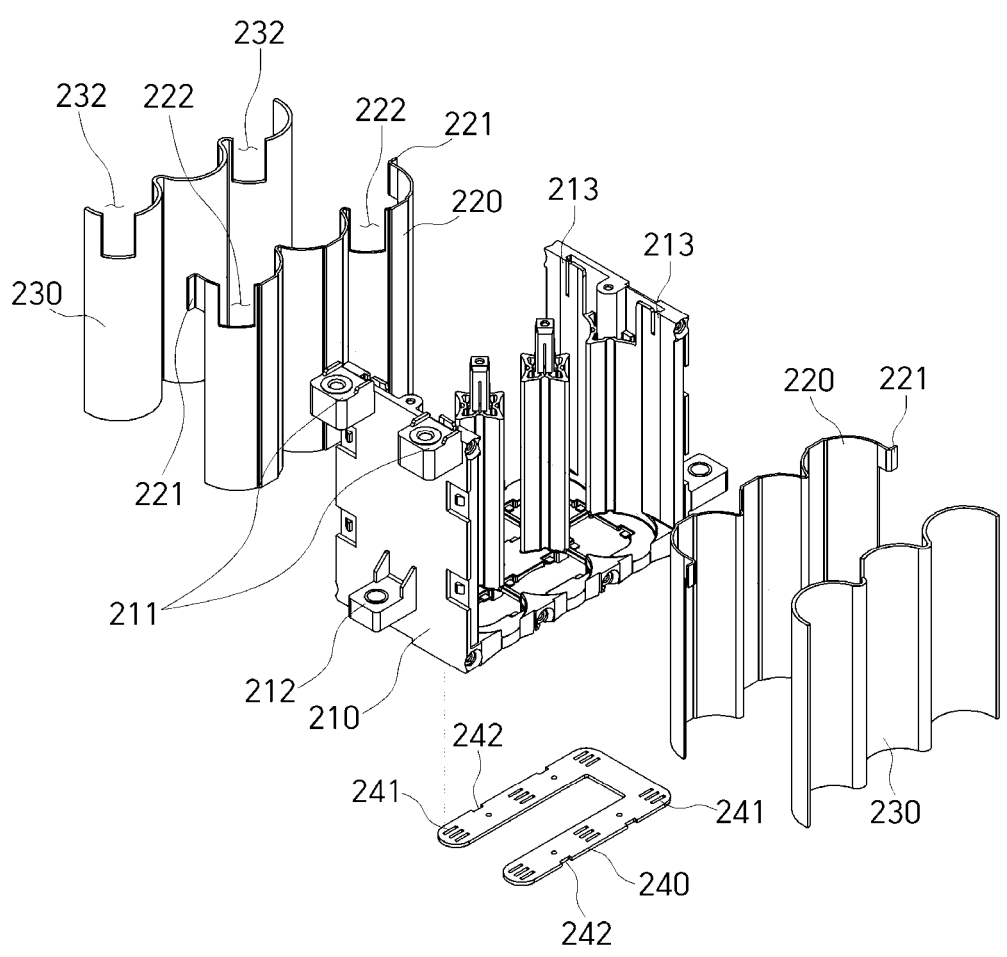
FIG. 3 is an exploded perspective view illustrating a center cartridge assembly (20)

FIG. 3 is an exploded perspective view illustrating the center cartridge assembly 20.

The center cartridge assembly 20 includes a center cartridge 210 having a form (a substantially hexahedral structure) into which six battery cells 10 may be inserted in an array of 2×3 and a pair of cooling plate inners 220 which are positioned between cells of a first row and cells of a second row of the battery cells 10 inserted into the center cartridge 210 and disposed in a central portion of the center cartridge 210 to cool inward-facing surfaces of the first row and the second row of the battery cells 10.

In addition, heat conduction interface members 230 attached to the cooling plate inners 220 in a self-adhesive manner to facilitate cooling of the battery cells 10 may be further included in the center cartridge assembly 20.

The components will be specifically described.

The center cartridge 210 is manufactured of a heat conductive plastic to serve as both a cooling member and a structural member. In the center cartridge 210, an upper portion is exposed for the battery cells 10 to be inserted, openings of which the number corresponds to the battery cells 10 are formed in a lower surface so that the electrodes of one sides of the battery cells 10 are exposed, and a left portion and a right portion are open so that side surfaces of the battery cells 10 are exposed. A front surface and a rear surface of the center cartridge 210 have a closed wall, respectively.

A connection busbar 240 which is connected (welded) to the electrodes of the battery cells 10 exposed through the openings of the lower surface of the center cartridge 210 to connect lower electrodes of the battery cells 10 is positioned on the lower surface of the center cartridge 210. Long holes 241 for welding are formed in the connection busbar 240. The long holes 241 for welding are formed to be welded to the electrodes of the battery cells 10 and will be described below. In addition, grooves 242, which are recessed inward from a side surface of an edge so that a width of the busbar decreases, are formed in the connection busbar 240 with intervals in a longitudinal direction of the connection busbar 240. The grooves 242 are coupled to coupling protrusions of busbar fixing parts 214 (see FIG. 6) for fixing when the connection busbar 240 is attached to the lower surface of the center cartridge 210. This will be described below.

In addition, terminal bases 211, on which end portions of output busbars 420 (to be described below) are installed as a final "+" terminal and a final "—" terminal of the battery cells 10, are formed on one surface of a wall structure of the front surface or the rear surface of the center cartridge 210. In addition, there is at least one module fixing part 212 on the front surface and/or the rear surface of the center cartridge 210 to fix the unit battery module to a module frame (not shown).

The cooling plate inners 220 are inserted between the front surface and the rear surface of the center cartridge 210 at right angles to vertically divide the center cartridge 210 into two portions. In order to provide stable and easy support after the insertion, first seating portions 221 (for example, protrusions) are formed on upper edges of the cooling plate inners 220. In correspondence with the first seating portions 221, second seating portions 213 (for example, slots), which are coupled to the first seating portions 221 to support the cooling plate inners 220 after the cooling plate inners 220 are inserted, are formed at inner sides of the front surface and the rear surface of the center cartridge 210.

As described above, the heat conduction interface members 230 may be attached to the cooling plate inners 220 in the self-adhesive manner. The heat conduction interface members 230 are positioned at interfaces between the cooling plate inners 220 and the battery cells 10 so that the cooling plate inners 220 and the battery cells 10 are pressed against each other to maximally transfer heat generated by the battery cells 10 to the cooling plate inners 220.

In addition, temperature sensor avoidance grooves 222, which prevent hooking of temperature sensors when the temperature sensors for measuring temperatures of the battery cells 10 are installed in the busbar housing assembly 40, are formed in at least one of the cooling plate inners 220. In addition, temperature sensor avoidance grooves 232 are also formed at corresponding positions in the heat conduction interface member 230 attached thereto.

Figure 4:
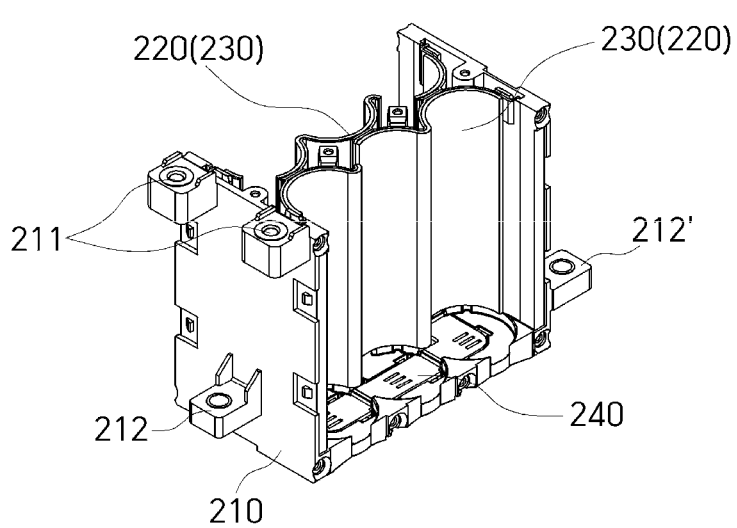
FIG. 4 is a perspective view illustrating a state in which components of the center cartridge assembly (20) are assembled.

FIG. 4 is a perspective view illustrating a state in which components of the center cartridge assembly 20 are assembled. It shows that the cooling plate inners 220 and the heat conduction interface members 230 attached thereto are installed between the front surface and the rear surface to divide an inner space of the center cartridge 210 having a hexahedral shape into two spaces, and the connection busbar 240 is installed on the lower surface. When one row of the battery cells 10 is inserted into each space at two sides divided by the cooling plate inners 220, and the connection busbar 240 is welded to the lower electrodes of the battery cells 10 through the openings of the lower surfaces, a first assembly of the unit battery module is completed. The inward-facing surface of the respective battery cell 10 may be in tight contact with the cooling plate inner 220 through the heat conduction interface member 230 and cooled by them.

Figure 5:
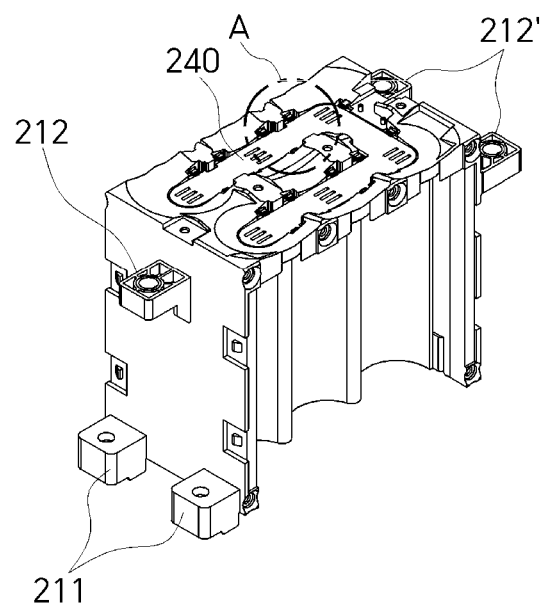
FIG. 5 is a bottom perspective view illustrating an assembled state of FIG. 4.

FIG. 5 is a bottom perspective view illustrating an assembled state of FIG. 4. It shows that the connection busbar 240 is installed on the lower surface of the center cartridge 210, one module fixing part 212 is formed on the front surface, and two module fixing parts 212' are formed on the rear surface.

Figures 6, 7:
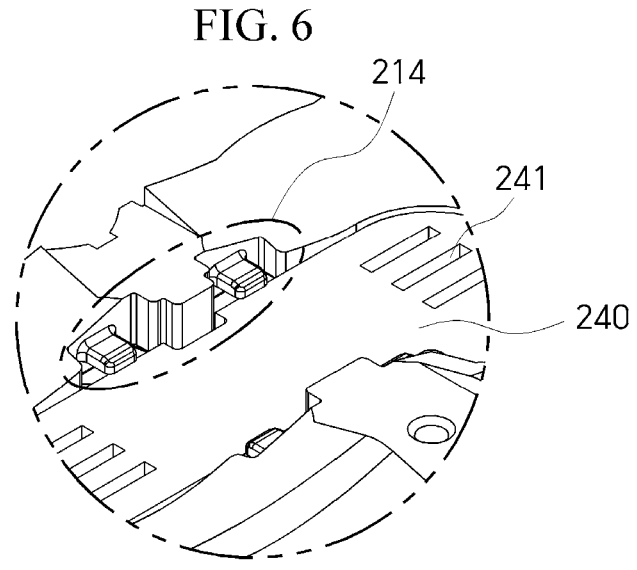
FIG. 6 is an enlarged view illustrating region A of FIG. 5.
FIG. 7 is an exploded perspective view illustrating one of side cooling cover assemblies (30)

FIG. 6 is an enlarged view illustrating region A of FIG. 5, and shows a structure in which the connection busbar 240 is fixed to the lower surface of the center cartridge 210. It shows that the connection busbar 240 formed of a metal is fixedly coupled to the busbar fixing parts 214 formed on the lower surface. The busbar fixing parts 214 include coupling protrusions inserted into the grooves 242 of the connection busbar 240 and fixing hooks formed at two sides thereof. A fixing structure of the connection busbar 240 of FIG. 6 is one example, and the connection busbar 240 may be fixed to the lower surface of the center cartridge 210 in one of various manners depending on a designer.

FIG. 7 is an exploded perspective view illustrating the side cooling cover assembly 30. Referring to FIG. 1 again, although a pair of side cooling cover assemblies 30 are formed to cover an exposed left portion and an exposed right portion of the center cartridge assembly 20, in FIG. 7, only one of the side cooling cover assemblies 30 (disposed at a left side of the center cartridge 210) is illustrated. Since a structure of the other side cooling cover assembly disposed at the other side is symmetrical thereto, a configuration and a form thereof will be easily understood from FIG. 7.

In FIG. 7, the one of the side cooling cover assemblies 30 includes a side cooling cover 310 which covers the left portion or the right portion of the center cartridge 210 and the cooling plate outer 320 which is disposed on an inner surface of the side cooling cover 310 and in contact with outward-facing surfaces of the battery cells 10 (portions seen from the exposed left side or right side of the center cartridge 210) to cool the battery cells 10. In addition, the one of the side cooling cover assemblies 30 may further include a heat conduction interface member 330 which is attached to the cooling plate outer 320 in a self-adhesive manner and pressed against the battery cells 10 to facilitate cooling.

The components will be specifically described.

The side cooling cover 310 illustrated in FIG. 7 has substantially an "L" shape to cover the left portion of the center cartridge 210 and a part of the lower surface, and a plurality of coupling parts 311 are formed at proper positions of the side cooling cover 310 for coupling with the center cartridge 210.

In addition, a plurality of holes 321 are formed in the cooling plate outer 320 in order to restrict a position when the cooling plate outer 320 is attached to the side cooling cover 310, and in correspondence therewith, a plurality of protrusions 312 are formed on an inner surface of the side cooling cover 310 at positions corresponding to the holes 321. Accordingly, the cooling plate outer 320 may be placed on and brazed to the inner surface of the side cooling cover 310 at the accurate positions.

The heat conduction interface member 330 may also be attached to the cooling plate outer 320 in the self-adhesive manner similar to that of described above. The heat conduction interface member 330 is positioned at an interface between the cooling plate outer 320 and the battery cells 10 to be pressed against the cooling plate outer 320 and the battery cells 10 so that heat generated by the battery cells 10 is maximally transferred to the cooling plate outer 320. Accordingly, the outward-facing surfaces of the battery cells 10 can be pressed against and effectively cooled by the cooling plate outer 320 through the heat conduction interface member 330.

Figure 8:
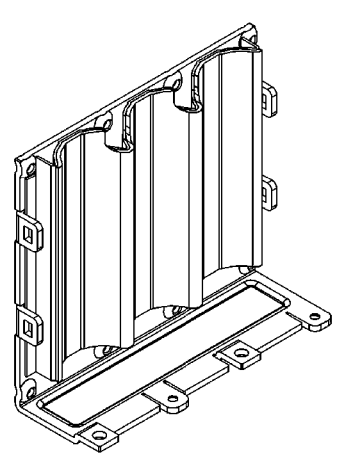
FIG. 8 is an assembly perspective view illustrating one of the side cooling cover assemblies (30)

In FIG. 8, the side cooling cover assembly 30 in which the cooling plate outer 320 and the heat conduction interface member 330 are assembled with the side cooling cover 310 illustrated in FIG. 7 is illustrated. The one of the side cooling cover assemblies 30 is coupled to the left portion of the center cartridge assembly 20 illustrated in FIG. 1. Similarly, although not illustrated in the drawing, the side cooling cover assembly at the other side may be coupled to the right portion of the center cartridge assembly 20 (see FIG. 9).

Figure 9:
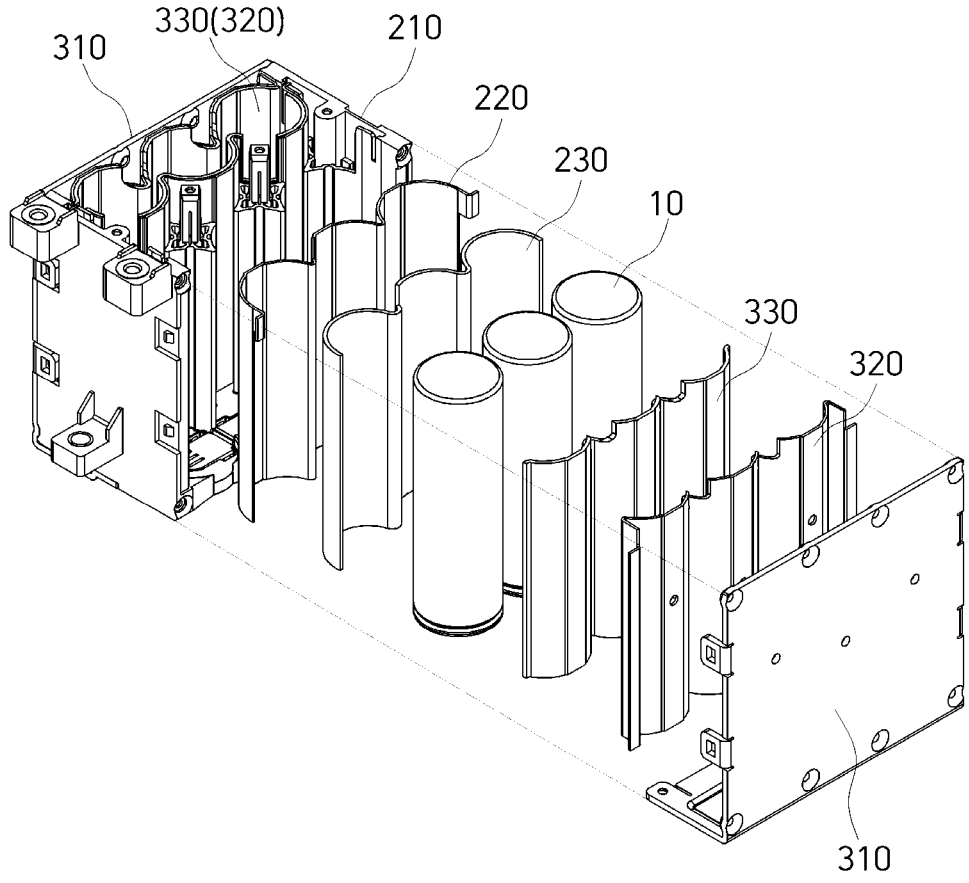
FIG. 9 is an exploded view showing that side cooling cover assemblies (30) are coupled to a left portion and a right portion of the center cartridge assembly (20) and battery cells (10) are inserted into a center cartridge (210)

FIG. 9 is an exploded view showing that the side cooling cover assemblies 30 are coupled to the left portion and the right portion of the center cartridge assembly 20 and the battery cells 10 are inserted into the center cartridge 210. It shows that the cooling plate inners 220 and the heat conduction interface members 230 are installed to divide the inner space of the center cartridge 210 into two spaces, the cooling plate outers 320 and the heat conduction interface members 330 are installed on the inner surfaces of the side cooling covers 310, and the battery cells 10 are inserted between the cooling plate inners 220 and the cooling plate outers 320. Accordingly, all of the inward-facing surfaces (that is, sides of the inner space of the center cartridge 210) and the outward-facing surfaces (that is, sides of the side cooling covers 310) of the battery cells 10 may be surrounded and effectively cooled by the cooling plate inners 220 and the cooling plate outers 320 through the heat conduction interface members 230 and 330.

Figures 10, 11:
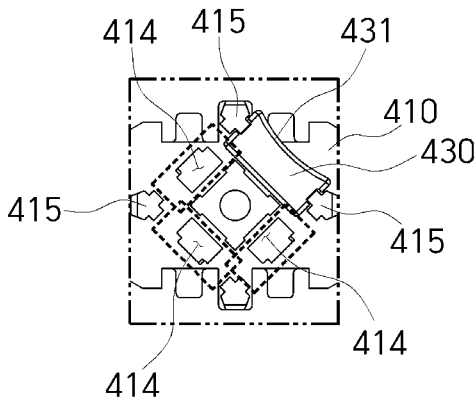
FIG. 10 is an exploded view illustrating a busbar housing assembly (40)
FIG. 11 is an explanatory view for describing a temperature sensor installation part (412) formed in a busbar housing (410)

FIG. 10 is an exploded view illustrating the busbar housing assembly.

The busbar housing assembly 40 includes a busbar housing 410 which is positioned above the battery cells 10 inserted into the center cartridge assembly 20 and in which openings 411 are formed to allow the upper electrodes of the battery cells 10 to be exposed and output busbars 420 which are installed on the busbar housing 410 and connected and welded to the electrodes of the battery cells 10 exposed through the openings 411. The output busbars 420 are not necessarily formed of a pair of metal conductors as illustrated in FIG. 10. Although this will be described below, the output busbars 420 may be provided in various shapes and numbers so that various serial-parallel combinations of the battery cells 10 may be obtained (the same applies to the connection busbar 240). Since "+" and "—" voltage should be finally output through the output busbars 420, end portions are attached to the terminal bases 211 of the center cartridge 210, which are described above, by screws or the like and exposed to the outside.

A plurality of long holes 421 for welding are formed in the output busbars 420 similarly to the connection busbar 240. The long holes 421 for welding are formed for welding with the electrodes of the battery cells 10 and will be described below. In addition, grooves 422, which are recessed inward from side surfaces, are formed in outer edges of the output busbars 420 at intervals so that a width decreases in a longitudinal direction. The grooves 422 are coupled to the busbar fixing parts 214 (see FIG. 6) when the output busbars 420 are installed on an upper surface of the busbar housing 410. Since this is the same as a concept of fixing the connection busbar 240 described above, the detailed description will be omitted.

In addition, one or more temperature sensors 430 for measuring temperatures of battery cells 10 are additionally installed on a temperature sensor installation part 412 of the busbar housing assembly 40. The temperature sensor installation part 412 may be positioned at a center of four battery cells 10 which are inserted and arrayed through the openings 411. The temperature sensor installation part 412 will be described below with reference to FIG. 11.

In addition, a wiring groove 413 through which wirings connected to the temperature sensors 430 pass is formed in the connection busbar housing 410, and the wiring groove 413 is formed in a space between the openings 411 formed as two rows on the busbar housing 410. The temperature sensors 430 may have curved surfaces (having, for example, concave curvatures to be in contact with cylindrical shapes) corresponding to shapes of outer surfaces of the battery cells 10 to be in contact with and measure temperatures of the battery cells 10. The temperature sensor avoidance grooves 222 and 232 are formed in the cooling plate inner 220 and the heat conduction interface member 230, respectively, to prevent hooking of the temperature sensors 430 while the temperature sensors 430 are installed, as described in FIG. 3.

FIG. 11 is an explanatory view for describing a detailed structure of the temperature sensor installation part 412 illustrated in FIG. 10.

Referring to FIG. 11, the temperature sensor installation part 412 (see FIG. 10) includes temperature sensor insertion holes 414. The plurality of (four in FIG. 11) temperature sensor insertion holes 414 are formed in the temperature sensor installation part 412 around the openings 411 (see FIG. 10) through which the battery cells are inserted so that the temperature sensors 430 are in contact with or close to surfaces of the temperature measurement target battery cells. Accordingly, the temperature sensors 430 having concave curvatures 431 similar to curvatures of outer surfaces of the battery cells 10 are inserted through the temperature sensor insertion holes 414 from top to bottom and installed to be in contact with or close to the battery cells.

In order to prevent the temperature sensors 430 from being separated after the insertion, elastic hooks 415 which fix the temperature sensors 430 are formed on the busbar housing 410. The hooks 415 may be designed to open when the temperature sensors 430 are inserted through the temperature sensor insertion holes 414 and to return to their original positions by elastic forces and fixedly push upper surfaces of the temperature sensor 430 after the temperature sensors 430 are completely inserted.

Referring to FIG. 10 again, a voltage sensor 440 which measures a voltage of the output busbar 420 is additionally connected to a plus (+) busbar which is one of the output busbars 420 through riveting or laser welding.

In addition, a connector 450 for connecting wirings of the temperature sensors 430 and a wiring of the voltage sensor 440 to an external device (for example, a battery management system (BMS)) is additionally provided. According to design, the connector 450 may be attached to the busbar housing 410 or also the center cartridge 210 described above according to a design.

A voltage sensor 460 which measures a voltage of the connection busbar 240 described above may also be connected to the connector 450. The voltage sensor 460 for voltage measurement extends downward from the connector 450 along an outer rear surface of the center cartridge 210 through a wiring 461 and is connected to the connection busbar 240 installed on the lower surface of the center cartridge 210 through riveting or laser welding.

Figure 12:
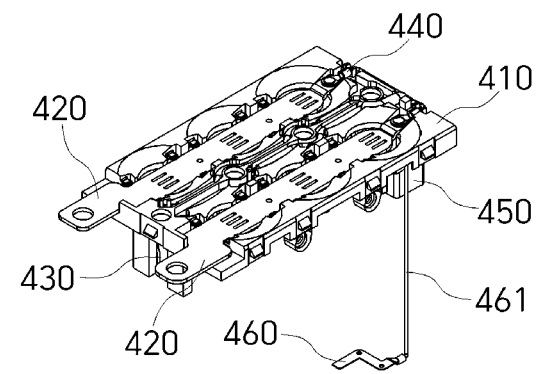
FIG. 12 is an assembly view illustrating the busbar housing assembly (40) of FIG. 10.

FIG. 12 is an assembly view illustrating the busbar housing assembly 40 of FIG. 10. It shows that the output busbars 420 are attached to the upper surface of the busbar housing 410, the temperature sensors 430 are installed, the voltage sensor 440 for the output busbars 420 and the connector 450 are installed, and the voltage sensor 460 for the connection busbar 240 extends downward from the connector 450 through the wiring 461. (The voltage sensor 440 for the connection busbar 240 will be installed in the center cartridge 210 when an entire module is assembled.)

Figure 13:
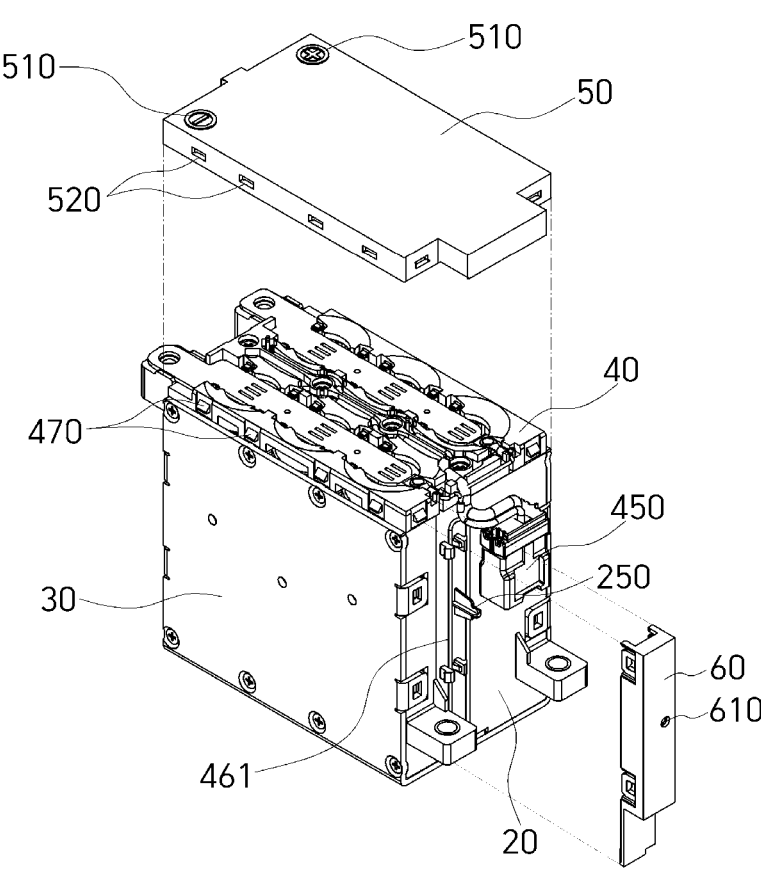
FIG. 13 is an explanatory view for describing an upper cover (50) and a protector (60)

FIG. 13 is an explanatory view for describing the upper cover 50 and the protector 60. It is illustrated that the side cooling cover assemblies 30 are coupled to left and right sides of the center cartridge assembly 20 and the center cartridge assembly 20 is covered by the busbar housing assembly 40.

The connector 450 is attached to a rear surface (a surface seen in the front in FIG. 13) of the center cartridge assembly 20, and the wiring 461 extends downward from the connector 450. The protector 60 is attached to the center cartridge assembly 20 in a lateral direction to prevent damage to the wiring 461. In order to attach the protector 60 at an accurate position, a guide protrusion 250 is formed on a corresponding surface of the center cartridge, and a guide groove 610 is formed in a corresponding surface of the protector 60. The protector 60 may be simply snap-attached at an accurate position using the units. However, a method of attaching the protector 60 may be variously changed depending on a designer or a shape of the module.

The upper cover 50 serves to prevent the output busbar 420 attached to an upper surface of the busbar housing assembly 40 from being exposed and protect an overall upper portion of the unit battery module. In the embodiment illustrated in FIG. 13, in an upper surface of the upper cover 50, marks 510 of a "+" and a "−" which indicate directivities of an output voltage of the battery cells 10 are carved, and a plurality of coupling units 520 for coupling with the busbar housing assembly 40 (for example, hooks) are formed along an outer edge. However, other coupling units 470 (for example, hook coupled grooves) coupled to the coupling units 520 are formed at corresponding positions of the busbar housing 410 of the busbar housing assembly 40.

FIGS. 14A-D show a set of views for describing that a degree of serial-parallel freedom of the battery cells 10 of the unit battery module may be secured by changing shapes and the numbers of connection busbars 240 of the center cartridge assembly 20 and the output busbars 420 of the busbar housing assembly 40. Even when six battery cells 10 are formed as a unit battery module having the same array of 2×3, various serial-parallel combinations, such as 1-serial 6-parallel, 2-serial 3-parallel, 3-serial 2-parallel, and 6-serial 1-parallel, may be achieved by variously changing the output busbars 420 and the connection busbars 240.

Figure 14A:
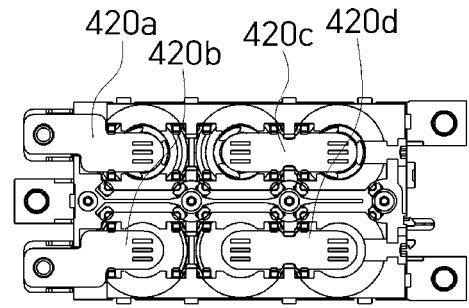
FIGS. 14A to 14D show a set of explanatory views for describing a degree of serial-parallel freedom of connection busbars (240) and output busbars (420).
Figure 14B:
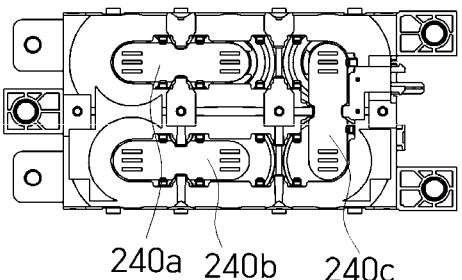
Figure 14C:
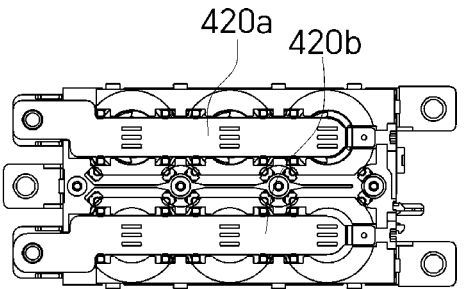
Figure 14D:
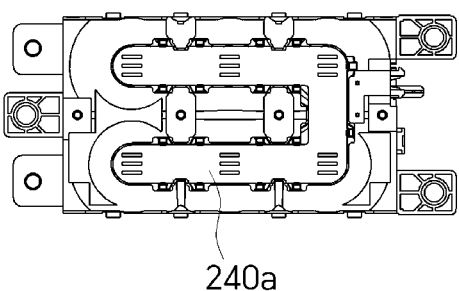

In FIG. 14A, it shows that a unit battery module can be formed as a 1-parallel/6-serial (1P6S) structure by connecting four pieces of output busbars 420a to 420d installed on the upper surface of busbar housing assembly 40 and three pieces of connection busbars 240a to 240c installed on a lower surface of the center cartridge assembly 20. In FIG. 14B, it shows that a unit battery module can be formed as a 3-parallel/2-serial (3P2S) structure by connecting two pieces of output busbars 420a and 420b installed on the upper surface of the busbar housing assembly 40 and one piece of a connection busbar 240a installed on the lower surface of the center cartridge assembly 20.

According to the present disclosure, a decrease in size is possible because there is no protruding portion for installing a temperature sensor on a battery cell frame and a temperature sensor avoidance groove is provided, a process is simplified because there is no through hole in a portion corresponding to a head portion of the temperature sensor, and the temperature sensor can be directly in contact with a measurement target portion (that is, a surface of a battery cell). In addition, since heat is conducted through a cooling plate without a separate radiation hole, cooling efficiency is improved, and since there are not a plurality of support holes and a heat sink on the frame, there is a cost reduction effect. In addition, weight reduction and insulation performance can be secured through a cartridge, a housing, and a cover which are formed of a synthetic resin, a composite material, or the like. In addition, since a busbar in which various cell combinations for obtaining a voltage/current such as 1-parallel 6-serial and 3-parallel 2-serial can be applied to a single bus housing, a degree of design freedom is maximized.

Although the present disclosure has been described in detail through exemplary embodiments, it will be understood by those skilled in the art that the disclosure may be performed in concrete forms different from the content disclosed in the present specification without changing the technological scope and essential features.

Therefore, the above-described embodiments should be considered as only examples in all aspects and not for purposes of limitation. In addition, it should be interpreted that the scope of the present disclosure is defined not by the detailed description but by the appended claims and encompasses all modifications and alterations derived from the scope and equivalents of the appended claims.

What is claimed is:

1. A battery module comprising:
a center cartridge assembly, on which a plurality of battery cells are arrayed and seated, including a cooling plate inner installed therein and configured to cool a part of each of the battery cells, wherein the center cartridge assembly further includes a center cartridge having an exposed upper portion to which the battery cells are inserted, a bottom surface having openings through which a portion of electrodes of the battery cells is exposed, and a front surface and rear surface which are closed wall structures, and two opposite sides;
a side cooling cover assembly which is coupled to the sides of the center cartridge assembly covering the two opposite sides and a portion of the bottom surface of the center cartridge assembly to protect the battery cells seated on the center cartridge assembly, the side cooling cover assembly including a cooling plate outer attached thereto and configured to cool the battery cells; and
a busbar housing assembly which is coupled to an upper portion of the center cartridge assembly and includes one or more output busbars installed thereon and configured to be electrically connected to an electrode exposed at an upper portion of each of the battery cells.

2. The battery module of claim 1, further comprising an upper cover configured to cover the busbar housing assembly, to protect the battery cells and the busbar housing assembly, and to serve as an upper finishing end of the battery module.

3. The battery module of claim 1, further comprising a protector attached to an outer surface of the center cartridge assembly to protect a wiring passing along the outer surface of the center cartridge assembly.

4. The battery module of claim 1, wherein the cooling plate inner of the center cartridge assembly is configured to divide a space of the center cartridge assembly into which the battery cells are inserted into two spaces, the cooling plate inner being in contact with and configured to cool parts of the battery cells which are positioned at divided spaces and facing the cooling plate inner.

5. The battery module of claim 1, further comprising an inner heat conduction interface member which is attached to the cooling plate inner of the center cartridge assembly and interposed between the cooling plate inner and the battery cells.

6. The battery module of claim 1, wherein the center cartridge assembly further includes a center cartridge having an exposed upper portion to which the battery cells are inserted, a bottom surface having openings through which a portion of electrodes of the battery cells is exposed, a left portion and a right portion which are exposed to allow side surfaces of the battery cells to be exposed, and a front surface and a rear surface which are closed wall structures.

7. The battery module of claim 1, wherein the center cartridge assembly further includes one or more connection busbars which are connected to electrodes of the battery cells to connect the electrodes of the battery cells to each other.

8. The battery module of claim 7, wherein the one or more connection busbars includes one or more grooves arranged in a longitudinal direction with an interval and recessed inwardly from a side surface of an edge of the one or more connection busbars so that respective widths of the one or more connection busbars decrease.

9. The battery module of claim 1, wherein, the center cartridge assembly further includes terminal bases to which a "+" terminal and a "−" terminal of the battery cells are attached.

10. The battery module of claim 1, further comprising an outer heat conduction interface member which is attached to a cooling plate outer of the side cooling cover assembly and interposed between the cooling plate outer and the battery cells.

11. The battery module of claim 1, wherein the one or more output busbars of the busbar housing assembly includes one or more grooves arranged in a longitudinal direction with an interval and recessed inwardly from a side surface of an edge of the one or more output busbars so that respective widths of the one or more output busbars decrease.

12. The battery module of claim 1, wherein the busbar housing assembly further includes a temperature sensor installation part for installing a temperature sensor to measure a temperature of the battery cells.

13. The battery module of claim 1, wherein the busbar housing assembly further includes a wiring groove through which a wiring connected to a temperature sensor for measuring a temperature of the battery cells passes.

14. A battery module comprising a center cartridge assembly, on which a plurality of battery cells are arrayed and seated, including a cooling plate inner installed therein and configured to serve to cool a part of each of the battery cells, wherein the center cartridge assembly further includes:

a center cartridge having an exposed upper portion to which the battery cells are inserted;

a bottom surface having openings through which a portion of electrodes of the battery cells is exposed;

a left portion and a right portion which are exposed to allow surfaces of the battery cells to be exposed;

a front surface and a rear surface which are closed wall structures;

one or more connection busbars which are connected to the electrodes of the battery cells to connect the electrodes of the battery cells to each other; and a side cooling cover assembly which is coupled to sides of the center cartridge assembly covering the left portion, the right portion, and a portion of the bottom surface of the center cartridge assembly to protect the battery cells seated on the center cartridge assembly, and wherein the cooling plate inner of the center cartridge assembly is configured to divide a space of the center cartridge assembly into which the battery cells are inserted into two spaces and to cool parts of the battery cells which face the cooling plate inner.

15. The battery module of claim 14, wherein the side cooling cover assembly including cooling plate outer attached thereto and configured to cool parts of the battery cells.

16. The battery module of claim 14, further comprising a busbar housing assembly which is coupled to an upper portion of the center cartridge assembly and includes one or more output busbars installed thereon and configured to be electrically connected to the electrode exposed at an upper portion of each of the battery cells.

* * * * *